US006935561B2

(12) United States Patent

Chernomorov

(10) Patent No.: US 6,935,561 B2

(45) Date of Patent: Aug. 30, 2005

(54) METHOD FOR CARRYING OUT VOTES, REFERENDUMS AND POLLS AND SYSTEM FOR THE IMPLEMENTATION THEREOF

(76) Inventor: Sergei Alexandrovich Chernomorov, Doninskoe shosse, 6-66, g. Ramenskoe, Moskovskaya oblast (RU), 140100

( * ) Notice: Subject to any disclaimer, the term of this patent is extended or adjusted under 35 U.S.C. 154(b) by 405 days.

(21) Appl. No.: 10/168,927

(22) PCT Filed: Dec. 26, 2000

(86) PCT No.: PCT/RU00/00527

§ 371 (c)(1), (2), (4) Date: Jun. 25, 2002

(87) PCT Pub. No.: WO01/50424

PCT Pub. Date: Jul. 12, 2001

(65) Prior Publication Data

US 2002/0194060 A1 Dec. 19, 2002

(30) Foreign Application Priority Data

Dec. 30, 1999 (RU) .......................................... 99127194

(51) Int. Cl.[7] ................................................ G06F 17/60

(52) U.S. Cl. .......................................... 235/386; 705/12

(58) Field of Search ................................. 235/379, 386; 705/12, 16, 18, 21

(56) References Cited

U.S. PATENT DOCUMENTS 6,722,562 B2 * 4/2004 Weiss .......................... 235/56

2002/0107717 A1 * 8/2002 Liu et al. ....................... 705/10

2003/0052160 A1 * 3/2003 Glover ....................... 235/375

FOREIGN PATENT DOCUMENTS

JP 09007035 A * 1/1997 ........... G07D/9/00

* cited by examiner

*Primary Examiner*—Karl D. Frech

*Assistant Examiner*—April Taylor

(74) *Attorney, Agent, or Firm*—Notaro & Michalos P.C.

(57) ABSTRACT

Method and apparatus with data collection and preprocessing subsystems interconnected by a network, carry out open and secret votes, referenda and public opinion polls. A payment system with communication environment is used with the subsystems and network. A poll data processing center for final processing of the data is connected to the subsystems by the communication environment. Software of the payment system includes functions for carrying out votes, referenda and public opinion polls, for preprocessing the data, for encrypting and decrypting the data, and for placing the data into information blocks to carry out the votes, referenda and polls. To exchange electronic messages containing these information blocks between the subsystems and the processing center, the software of the center includes functions for exchanging the messages, for decrypting the blocks and for accumulating and analyzing the data in the blocks.

3 Claims, 4 Drawing Sheets

METHOD FOR CARRYING OUT VOTES, REFERENDUMS AND POLLS AND SYSTEM FOR THE IMPLEMENTATION THEREOF

FIELD OF THE INVENTION

The invention relates to social sphere and is intended for carrying out votes, referenda and public opinion polls.

BACKGROUND OF THE INVENTION

Known are methods for voting and systems therefor which perform the count of "pros" and "cons" using specific electronic devices, and determine their percentage ratio (see, for example, USSR Author's Certificate, 1539811, Int. Cl. G 07 C 13/00, 1990; Russian Patent 2015570, Int. Cl. G 07 C 13/00, 1994).

The closest analogue by its technical essence and the result achieved is the method for carrying out vote and the electronic system for implementing thereof including a precinct system comprising a central processor and electronic ballots connected to said central processor by electronic interface circuits. The precinct system, in turn, can be connected to higher level systems: city, county, state, country. Said systems communicate via telecommunication network and modems connected to the central processors of corresponding systems, and all the data being transmitted are encrypted.

Secrecy of the vote in said precinct system is ensured by using for voting a special electronic key card being provided individually to each voter. Every such card has a unique number which is generated by the precinct system, and is used only once. This number is recorded onto a magnetic stripe of the electronic key card using a corresponding writing device connected to the central processor of the system.

The precinct system voting is carried out as follows. A voter accesses any of electronic ballots with the help of his/her electronic key card and makes his/her choice. After the voter removes his/her card from the ballot, the system makes a record in its database according to the fact of this voting and then initializes this ballot for the next vote. The voting data are real-time displayed on the monitors of system operators and precinct observers, and are also transmitted via said telecommunication network to the higher level systems (PCT Application WO 96/02044, Int. Cl. G 07 C 13/00, published in 1996).

Disadvantages of this system are the high cost (particularly when taking into account the intended one-fold usage of this system) and necessity for the voters to vote only in a limited number of places specially assigned for voting, i.e., the precincts.

SUMMARY OF THE INVENTION

The object of the present invention is to expand the usage area of the described system by means of ensuring the possibility to carry out not only votes, but also referenda and public opinion polls, to reduce the costs for creating the system, to ensure its repeated utilization, and to achieve the maximum comfort for participants of votes, referenda and public opinion polls.

This object is achieved by that in a system for carrying out votes, referenda and public opinion polls, which includes an integrated system for collecting data on arrangements being carried out, said integrated system consisting of a data collection subsystem and data preprocessing subsystem interconnected by means of a data network, a payment system of any level—international, national, regional, local, or a combination of such payment systems is used as the integrated system for collecting the data on arrangements being carried out, and a communication environment of said payment system is used as the data network, said system for carrying out votes, referenda and public opinion polls comprising a poll data processing center for a final processing of said data, the center being connected to said data collection and data preprocessing subsystems via said communication environment, the software of said payment system including an additional set of functions for carrying out votes, referenda and public opinion polls, for preprocessing the data on arrangements being carried out, for encrypting and decrypting those data, and for placing those data into information blocks to carry out both open and secret votes, referenda and public opinion polls, to exchange electronic messages containing said information blocks between said data collection and data preprocessing subsystems and the poll data processing center, and the software of the poll data processing center including a set of functions for exchanging said electronic messages with said subsystems, for decrypting the information blocks included in those messages, for accumulating and analyzing the data on votes, referenda and public opinion polls contained in those information blocks.

Hereinafter, the communication environment of the payment system is recognized as telecommunication networks, communication equipment and information exchange protocols used within the framework of this system.

The peculiarity of the system according to the present invention is in that the poll data processing center consists of a communication computer with a communication device connected to it, a central computer with a long-term data storage device connected to it, and personal computers, all said computers being coupled via a local area network, and said communication device being connected with said communication environment.

The said object is also achieved by that in a method for carrying out votes, referenda and public opinion polls, the method including steps of: identifying voters and respondents in accordance with individual electronic key cards; receiving information on the choice made by them; transmitting this information via telecommunication networks, and processing subsequently the accumulated information; the step of identifying the voters and respondents is performed by means of POS terminals and automatic teller machines operated by the payment system, and payment instruments of said payment system being at the disposal of the voters and respondents are used as the individual electronic key cards, and information about the voters and respondents as well as the choice made by them in the form of electronic messages consisting of encrypted information blocks are directed from said POS terminals and automatic teller machines to the processing centers of said payment system, wherefrom those electronic messages after preprocessing are directed to the poll data processing center for decrypting said information blocks and final processing the data on votes, referenda and public opinion polls.

Hereinafter, in order to simplify the enunciation, the term "poll" will be used instead of terms "vote", "referendum", "public opinion poll", and voters, or persons expressing their opinion or answering the questions of any poll will be denoted by the term "respondent". In this case, the term "public opinion poll" pertains to the procedure of ascertaining opinions on the same subject or obtaining answers on the same question from three or more persons during a limited time period.

BRIEF DESCRIPTION OF DRAWINGS

The invention is clarified by the drawings, where.

DETAILED DESCRIPTION OF THE INVENTION

For the better understanding of the invention essence it is necessary to describe a conventional diagram of well-known payment systems.

The well-known payment systems are based on financial interrelations between the system participants arising in connection with holders of payment instruments of that system performing the following operations: performing payments for goods and services, cash withdrawals at automatic teller machines (ATMs) as well as other operations provided for by the rules of this payment system. In the simplest case, the payment system operation is controlled by a single company (particularly, a bank) which is also an issuer of the payment instruments of that system. Moreover, participants of that system are both holders of the payment instruments and points-of-sale providing goods to the holders upon presentation of any of said payment instruments. In the case of a developed payment system which, as a rule, is established in the form of an interbank association, a conventional list of participants looks as follows:

payment instruments issuing banks (issuers);

acquiring banks (acquirers);

settlement banks;

processing centers (PCs);

holders of payment instruments;

points-of-sale.

In this case, the rules of existing payment systems of such type allow banks to combine functions of issuer and acquirer.

Various types of the payment instruments are utilized in modem payment systems. As a rule, the payment instrument is a rectangular card made of paper (carton), plastic or metal and carrying unique information which allows to identify unambiguously the payment system and issuer of this payment instrument, its holder, as well as the payment instrument itself within the framework of its payment system. Accordingly, methods used to place said information on payment instruments are divided into following groups:

graphical recording;

embossing (mechanical relief pressing-out);

bar-encoding;

encoding of the magnetic stripe;

writing in the integrated circuit;

laser writing (utilized in the so called optical cards).

The most wide-spread payment instrument of the modern payment systems are plastic cards of the following types:

magnetic stripe cards;

integrated circuit cards (the so called smart cards);

hybrid cards combining the above two methods of information storage.

The rules of every particular payment system contain well-defined requirements on design and technical performance of the payment instruments utilized in that system.

Figure 1:
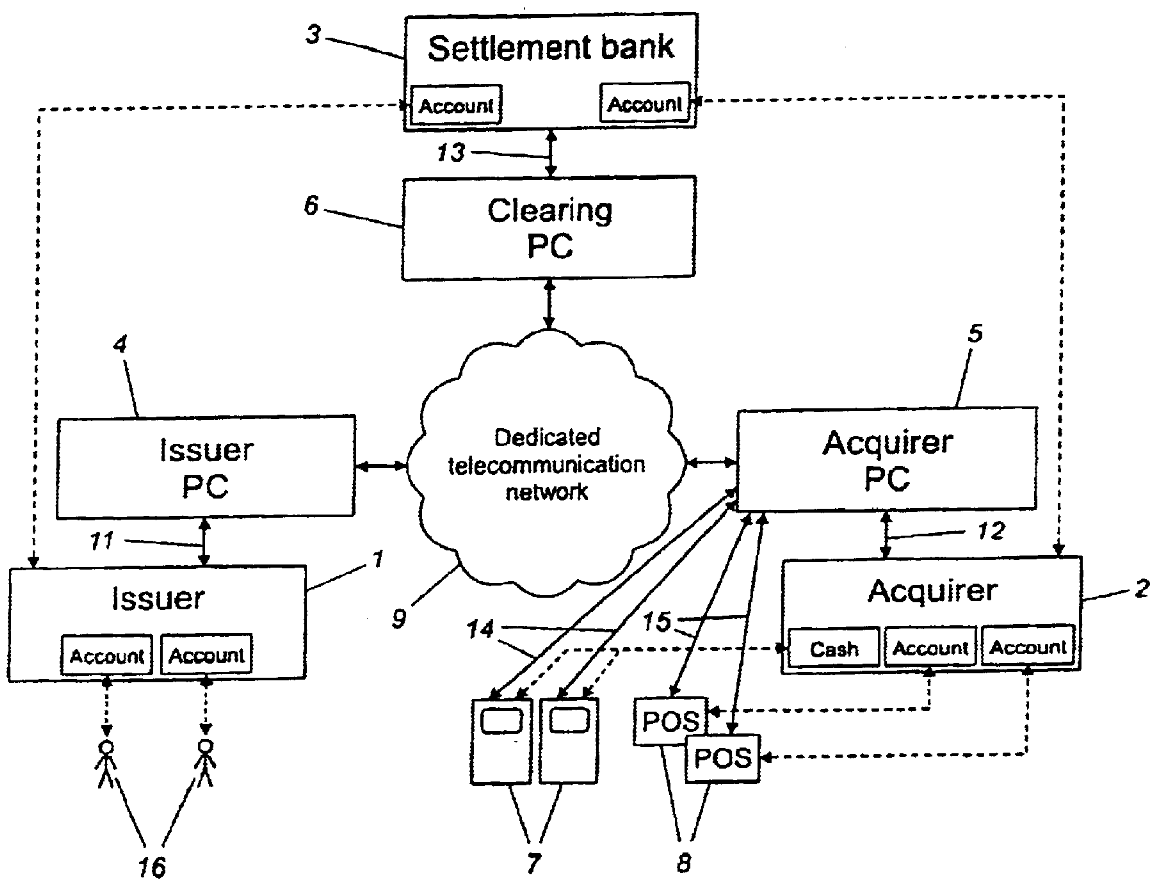
Fig. 1 (PRIOR ART)
FIG. 1 shows a conventional diagram of a modem interbank payment system.

In order to describe a modem interbank payment system, refer now to its conventional diagram depicted in FIG. 1.

As it was mentioned above, the payment instrument in such system is a plastic card containing a magnetic stripe or an integrated circuit. The payment system is based on financial interrelations between the banks of the following types:

1) Issuer 1—opens card accounts for its clients and provides them with cards used by these clients (cardholders 16) to make purchases in points-of-sale 8, withdraw cash at ATMs 7, and perform other transactions consistent with the rules of the payment system;

2) Acquirer 2—provides cash to cardholders 16 of the payment system at its ATMs 7, and enters into agreements with points-of-sale 8, according to which these points-of-sale 8 provide goods to cardholders 16 of the payment system;

3) Settlement bank 3—keeps correspondent accounts of the issuers 1 and acquirers 2, opened for mutual settlements with respect to transactions performed by cardholders 16 of the system.

Each of the banks 1–3 can be connected with one or more processing centers (PCs) 4–6, i.e., companies performing, on behalf of their banks, the real-time processing of transactions undertaken by cardholders 16, as well as the information exchange via the dedicated telecommunication network 9 being a part of communication environment of this payment system. Depending on the type of functions delegated by the banks 1–3 to their PCs 4–6, these PCs can be divided into the following types:

1) Issuer PC 4: stores in its database the data on its bank's cardholders 16 and the cards themselves, as well as on balances of accounts linked to these cards. Issuer PC 4 uses said data to respond to authorization requests (see below) received from acquirer PC 5 at the moment the cardholders 16 perform transactions using cards of the discussed payment system. PC 4 is connected with its issuer 1 via the public telecommunication network 11;

2) Acquirer PC 5: maintains the connection via public telecommunication networks 14 and 15 with ATMs 7 of its acquirer 2 and with electronic terminals (POS terminals) of the points-of-sale 8 signed up by this bank, and also handles telephone requests from cashiers of the points-of-sale 8 in the case of the so called voice authorization. When a cardholder 16 performs the transaction at ATM 7 or point-of-sale 8 serviced by such PC, this center forms an authorization request (see below) and transmits it to issuer PC 4. Acquirer PC 5 also transmits the information about all transactions it serviced to clearing PC 6. PC 5 is also connected with its acquirer 2 via the public telecommunication network 12;

3) Clearing PC 6: performs, for the settlement bank 3, daily clearing (calculation of settlement totals for issuers 1 and acquirers 2 having correspondent accounts with the settlement bank 3), based on the information received from acquirer PCs 5 on transactions performed by cardholders 16 of this payment system. In addition, all electronic messages exchanged between PCs 4, 5 are necessarily routed via clearing PC 6. This allows the clearing PC 6, in particular, to respond to authorization requests (see below) on behalf of issuer PC 4 in the case of in the case of disconnection with it, malfunctions in the computer system of the latter, etc.

The clearing PC 6 is connected with its settlement bank 3 via the public telecommunication network 13.

Now the procedure of preparing the payment card for providing it to its cardholder 16 will be discussed. Before the issuer 1 provides the cardholder 16 with a new card, PC 4 of this bank performs the so called personalization of this card during which the information about this card and its cardholder 16 (card number, expiry date, cardholder's first and last name, etc.) is placed onto the card, and, depending on the card type, is also encoded on the magnetic stripe or written on the card IC. Numbers of all cards of the payment system are unique, the first six digits of the card number represent the bank identification number (BIN), a number assigned by the payment system to the issuer 1 on its request for some series of issued cards, which allows to unambiguously identify the bank and the card series. In addition to the card, the computer system of the issuer PC 4 generates for this cardholder 16 a personal identification number (PIN), a pseudo-random number used to confirm a cardholder's 16 identity at ATMs 7 or points-of-sale 8 terminals. After the card has been personalized, the information about card, its cardholder 16 and his/her account with the issuer 1 is stored in a database of the issuer PC 4. If the issuer 1 has agreements simultaneously with several PCs 4, the information about all cards of this bank with the same BIN should be stored in the database only of one of these PCs 4. Thus, the card BIN indicates unambiguously not only the issuer 1 but also the issuer PC 4 responding to authorization requests from acquirer PCs 5 concerning that card, which allows PCs 5 to define the network address of the issuer PC 4 when transmitting said requests via the dedicated telecommunication network 9.

Figure 2:
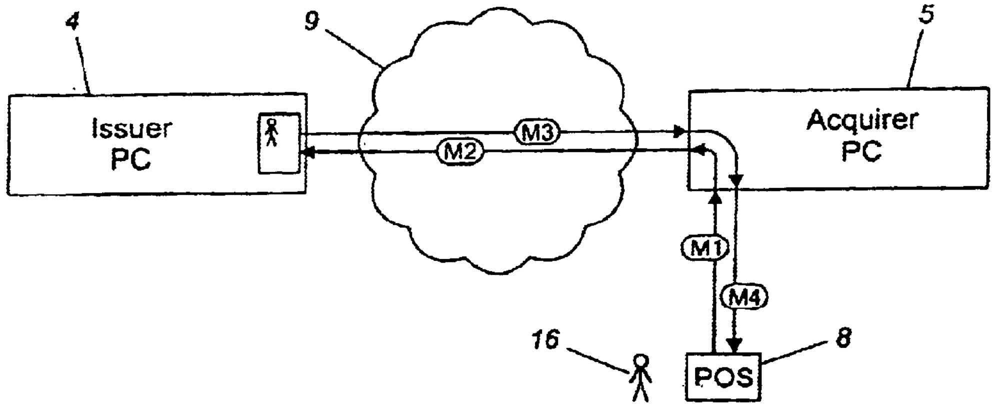
Fig. 2 (PRIOR ART)
FIG. 2 shows a conventional diagram of exchanging the information messages between participants of a purchase payment procedure in said payment system.

Now a conventional procedure of how to make purchases with a card will be discussed. A diagram of the information messages exchange between participants of this procedure is depicted in FIG. 2 (the fact that, in accordance with the rules of the payment system, all electronic messages by which PCs 4, 5 of this system exchange, are necessarily routed the clearing PC 6 is not shown in FIG. 2 as insignificant). The cardholder 16 gives his/her card to the point-of-sale 8 cashier, who checks visually the validity and, as far as possible, the authenticity of this card. If the rules of the payment system require that the cardholder's photo should appear on the card, the cashier also compares the cardholder 16 with the person in that photo. After that the cashier, depending on technical means he/she has at his/her disposal, performs either voice or electronic authorization. In the case of voice authorization the cashier calls an operator of the acquirer PC 5 of servicing this point-of-sale 8 and reports the point-of-sale 8 code assigned by that PC, as well as the card number, transaction code, purchase amount and other necessary information (message M1). The operator of the PC 5 enters all received information into the terminal of the computer system of the PC 5 and initiates, without breaking the connection with the cashier, the transmission via the dedicated telecommunication network 9 to the PC 4 servicing the card issuer, of a so called authorization request (message M2) based on the above mentioned information. The computer system of the issuer PC 4 compares the information received in the request with the data about this card and the status of the cardholder's 16 account stored in this PC's database, and transmits back to the acquirer PC 5 one of the following responses (message M3):

allow the purchase;

refuse the purchase;

pick-up the card;

cardholder should contact the issuer;

other possible responses.

The detailed content of the response is displayed on the screen of the terminal of the operator initiated that authorization request, and he/she reports the necessary data to the cashier (message M4), completing thus the voice authorization procedure. Then the cashier, depending on the information received from the operator, either provides the cardholder 16 with a receipt (slip) and the purchase, or performs other necessary actions.

In the case of electronic authorization the cashier types on the POS terminal keyboard the transaction code, purchase amount and other necessary information, and then inserts the card into the terminal. If, according to the card acceptance rules in this point-of-sale 8, the cardholder 16 should be additionally identified using the PIN, he/she, following the cashier's instructions, enters the PIN on a separate PIN pad turned to the cardholder 16 and protected from a stranger's look. After a certain key has been pressed by the cashier the POS terminal transmits to the acquirer PC 5 an electronic message (message M1) containing the information entered into the terminal by the cashier and the cardholder 16 and also read from the magnetic stripe or integrated circuit of the card. On the basis of this message the acquirer PC 5, like in the case of voice authorization, transmits the authorization request (message M2) to the issuer PC 4 via the dedicated telecommunication network 9. On receiving a response from the issuer PC 4 (message M3) the acquirer PC 5 transmits it to the point-of-sale 8 terminal (message M4). If the response proved positive, the POS terminal prints a receipt to be signed by the cardholder 16 (the signature is not required if the cardholder 16 has entered his/her PIN), and the cashier provides the cardholder 16 with the purchase. Irrespective of the authorization method, the information related hereto is stored in the database of both PCs. The authorization procedure in the case of cash withdrawals generated by cardholders 16 at ATMs 7 is substantially similar to the described electronic authorization excluding the fact that due to the cashier's absence the cardholder 16 types the PIN and the requested amount on the keyboard of ATMs 7.

The system according to the present invention (FIGS. 3 and 4) comprises a payment system including:

issuers 1 of payment instruments for this system;

acquirers 2;

settlement banks 3;

issuer PCs 4;

acquirer PCs 5;

clearing PCs 6;

ATMs 7;

points-of-sale 8;

communication environment comprising the dedicated telecommunication network 9 and the public telecommunication networks 11–15;

wherein:

each issuer 1 is connected via the public telecommunication network 11 with one or more issuer PCs 4;

each acquirer 2 is connected via the public telecommunication network 12 with one or more acquirer PCs 5;

each settlement bank 3 is connected via the public telecommunication network 13 with some of clearing PCs 6;

all above mentioned PCs 4–6 are interconnected by means of the dedicated telecommunication network 9;

each ATM 7 is connected via the public telecommunication network 14 with any of acquirer PCs 5;

each point-of-sale 8 is connected via the public telecommunication network 15 with some of the acquirer PCs 5;

each respondent 16 (holder of the payment instruments) has one or more payment instruments each of which is issued by a certain issuer 1.

Figure 3:
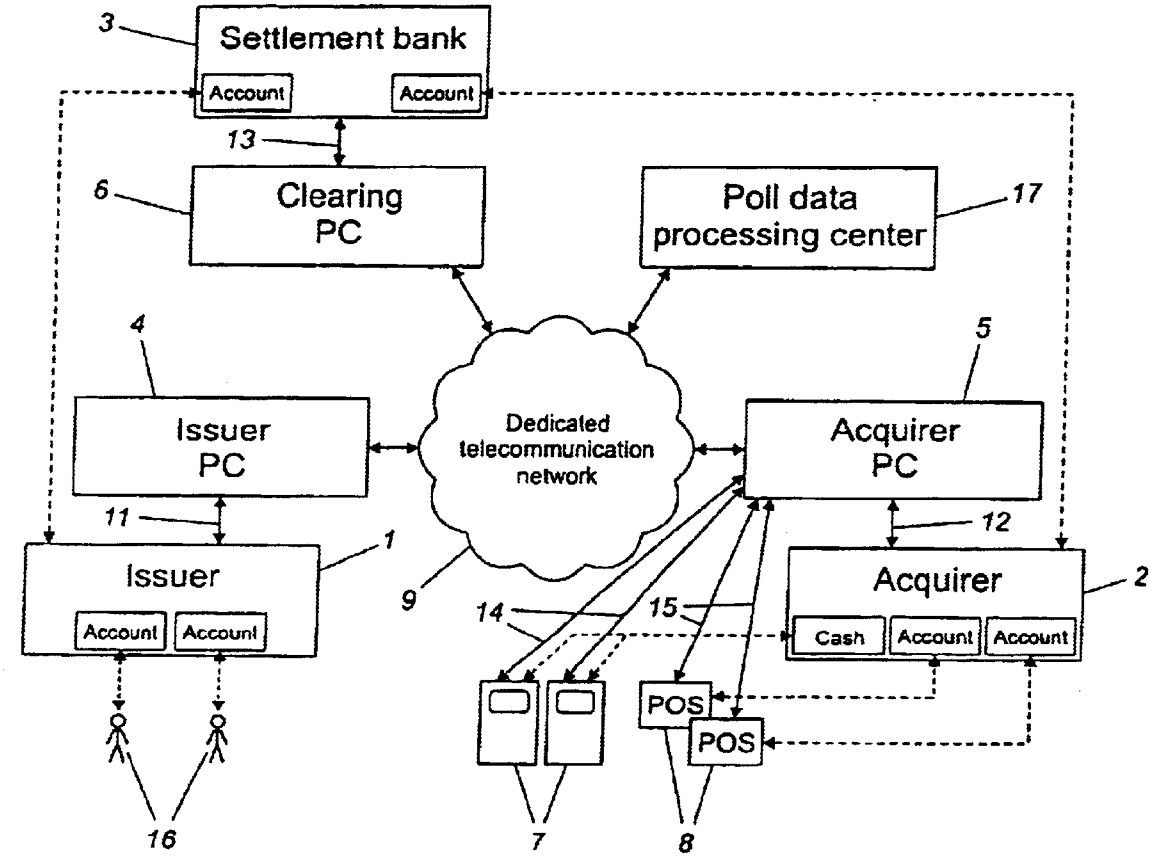
FIG. 3 shows a diagram of a system for carrying out polls according to the present invention for the case, when the poll data processing center (PDPC) is connected with the processing centers of the payment system via a dedicated telecommunication network.
Figure 4:
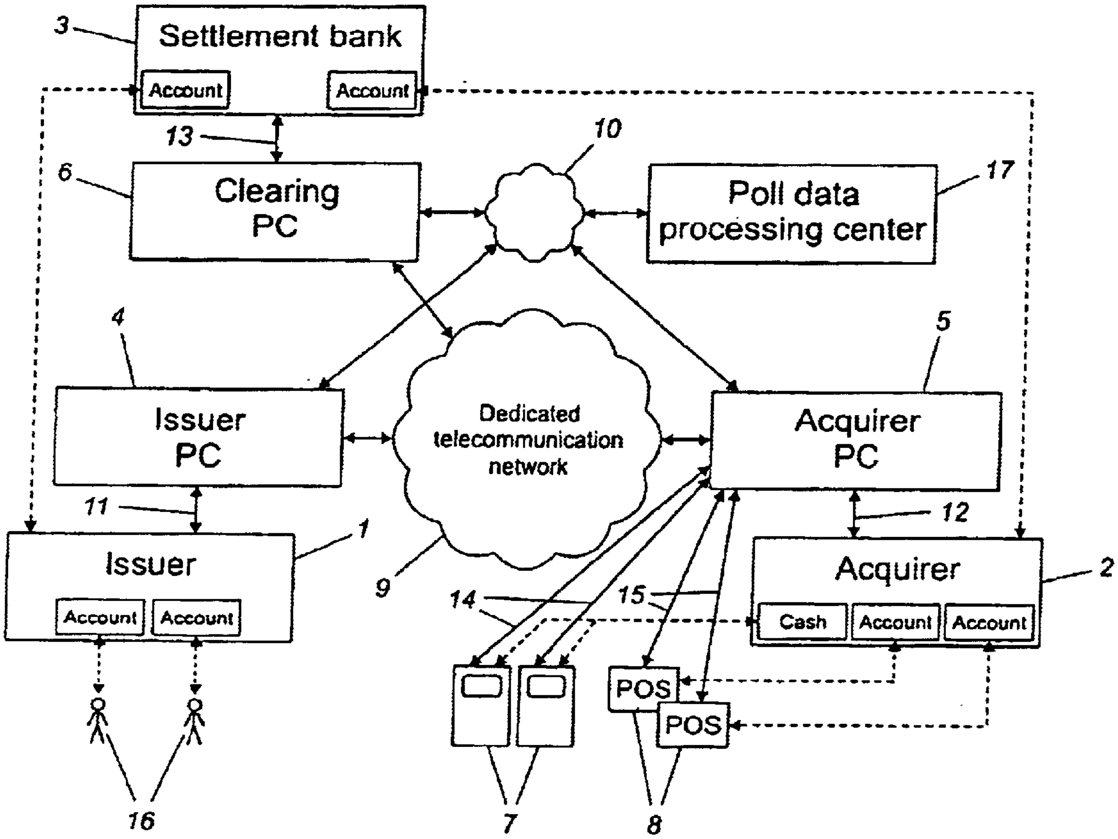
FIG. 4 shows a diagram of a system for carrying out polls according to the present invention for the case, when the PDPC is connected with the processing centers of the payment system via a public telecommunication network.

The system according to the present invention also includes the public telecommunication network 10 (only in the embodiment of system depicted in FIG. 4), the PDPC 17 connected with the PCs 4–6 of the above mentioned payment system via either a dedicated telecommunication network 9 (FIG. 3), or the public telecommunication network 10 (FIG. 4), and an additional set of functions of the software of this payment system for carrying out polls and processing the poll data (not shown in FIGS. 3 and 4).

Figure 5:
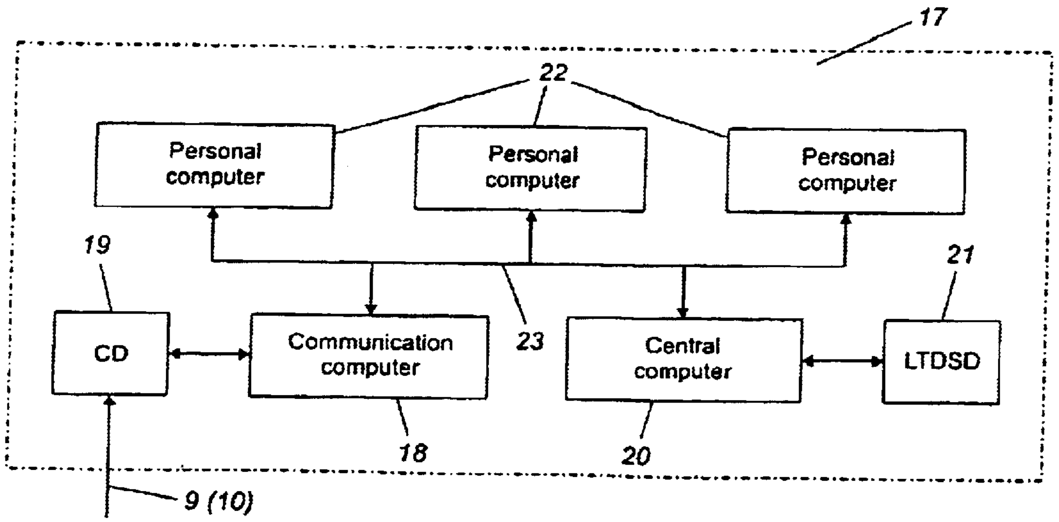
FIG. 5 shows a PDPC diagram.

The PDPC 17 (FIG. 5) is a computer system which can comprise the following:

- a communication computer 18 with a connected communication device (CD) 19 coupling the PDPC 17 with either the dedicated telecommunication network 9 of the above mentioned payment system, or the public telecommunication network 10;
- a central computer 20 having a long-term data storage device (LTDSD) 21 connected to it;
- personal computers 22 of the operators;
- a local area network (LAN) 23 connecting computers 18, 20, 22.

The additional set of functions for the software of the above mentioned payment system for carrying out polls and processing the poll data comprises functions added into the software of PCs 4–6, ATMs 7 and points-of-sale 8 terminals, functions added to the software of the PCs 4–6 being as follows:

- encrypting and decrypting the data when exchanging electronic messages via the dedicated telecommunication network 9 and public telecommunication networks 10–15;
- transmitting to the PDPC 17 electronic messages containing the data about the respondents' 16 answers to the questions of any poll.

In addition to the above mentioned functions a function of detecting a respondent's 16 attempt to answer twice or more the same question of any poll is added into the software of the issuer PC 4.

The following functions are added into the software of ATMs 7 and points-of-sale 8 terminals:

- initiating the "poll operation";
- interpreting data entered on the keyboard of this device in accordance with the specific requirements related to the "poll operation";
- encrypting and decrypting electronic messages when exchanging information with the acquirer PC 5 via the public telecommunication networks 14, 15;
- printing for the respondent 16 a special receipt containing the data on poll participation.

The device being described allows to carry out both open or nominal, and anonymous or secret polls. This is achieved by dividing the electronic messages containing the data on the respondent's 16 answers into following information blocks:

- an information block I1 comprising a code of the poll and a number of a question;
- an information block I2 comprising a the answer code (for example, "0" means "No", "1" means "Yes", "2" means "I don't know", "3" means "All the same" or other ones);
- an information block I3 comprising data about the respondent 16 similar to the data included in a typical authorization request (the payment instrument number, expiry date, cardholder's first and last name, etc.).

Before starting every poll the PDPC 17 transmits to PCs 4–6 of the payment system an electronic notification of the forthcoming poll, including, among other data, the poll type (open or anonymous). While carrying out a poll the computer system of any of PCs 4–6 intending to send to the PDPC 17 an electronic message about the respondents' 16 answers, determines, according to the poll type, which of the above mentioned information blocks can be transmitted to the PDPC 17, then encrypts each of the selected information blocks independently of other ones and includes it in the message content. Thus, in the case of open polls, the PDPC 17 will receive messages containing all the above mentioned information blocks, and in the case of anonymous polls only information blocks I1 and I2 will be included in the content of such messages. Moreover, in the case of open polls all components of electronic messages related to the respondent's 16 answers received during the poll are stored in the databases of PCs 4–6, while in the case of anonymous polls information blocks 12 are deleted and only after that these messages are stored in the databases of PCs 4–6. As a result, on completing an anonymous poll the PDPC 17 obtains data related to the respondents' 16 answers to the questions of this poll but does not know these respondents' 16 names, while PCs 4–6 know the names of the respondents 16 participated in this poll but do not obtain any information about these respondents' 16 answers.

There exist two possibilities of how to organize the information exchange between poll participants. The first variant assumes that the PDPC 17 receives the data related to the respondents' 16 answer from the PC 4 servicing the issuer of the payment instrument which was used by the respondent 16 to take part in the poll. In the second variant the mentioned data are provided to the PDPC 17 from the acquirer PC 5 servicing that point-of-sale 8 or ATM 7 which was used by the respondent 16 to participate in the poll. All necessary instructions related to selection of the information exchange variant are included in the above mentioned notifications received by the PCs 4–6 from the PDPC 17.

Figure 6:
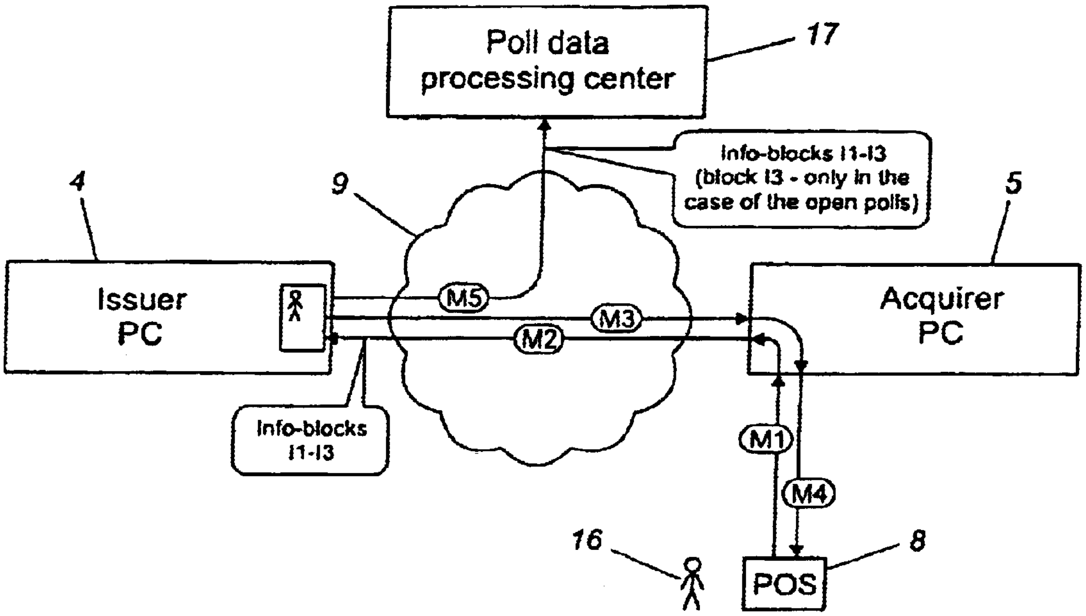
FIG. 6 shows a diagram of exchanging the information messages between participants of the poll procedure for the case, when the PDPC receives data about respondents' answers from the acquirer processing center.
Figure 7:
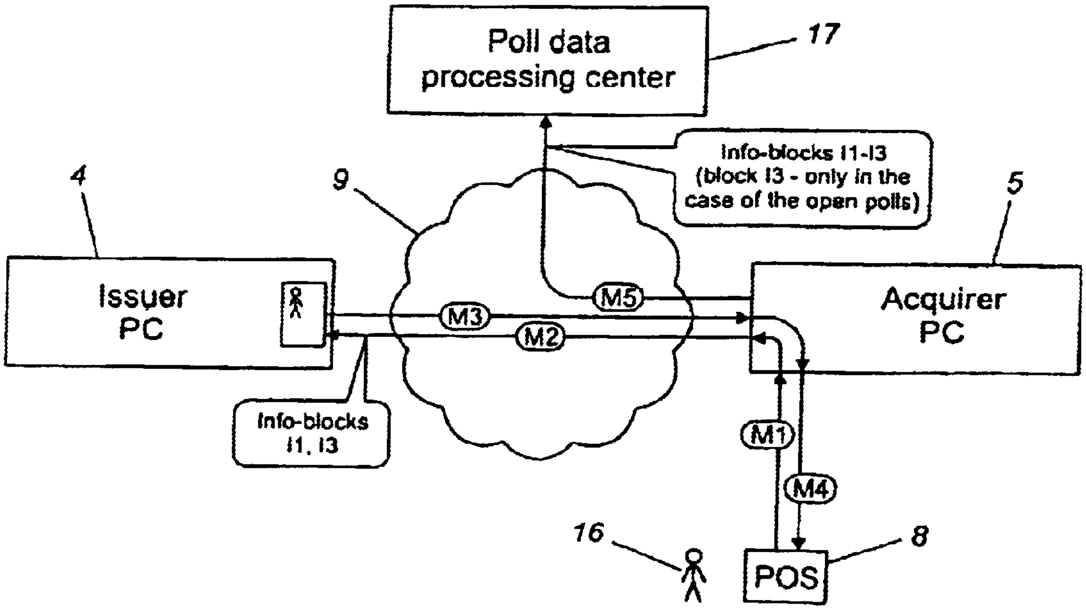
FIG. 7 is a diagram similar to FIG. 6 of another step of the present invention.

Now interaction of system elements according to the present invention when carrying out a poll will be described. The diagrams of the information messages exchange between poll participants corresponding to the two above mentioned variants of organizing this exchange are depicted in FIGS. 6 and 7. For the sake of simplicity the mentioned diagrams are given for that variant of the system according to the present invention in which the PDPC 17 exchanges information with the PCs 4–6 of the payment system via the dedicated telecommunication network 9. Answers to the poll questions are directed by the respondent 16 to the system via a point-of-sale 8 cashier (in the case of voice authorization), point-of-sale 8 terminal (in the case of electronic authorization), or ATM 7. Depending on the system notification method selected by the respondent 16 the mentioned information (message M1) is provided to the acquirer PC 5 servicing the point-of-sale 8 or ATM 7 either as a voice message of a point-of-sale 8 cashier to the operator of the acquirer PC 5, or as an electronic message from the corresponding device. In the latter case, the software of this device encrypts said message before sending it to the acquirer PC 5. On receiving and, if necessary, decrypting the message M1 sent in one of the two ways, the acquirer PC 5 extracts from the information block I3 of this message the number of the payment instrument of the respondent 16 and determines thus the address of the corresponding issuer PC 4 in the dedicated telecommunication network 9 of the payment system. After that the acquirer PC 5 encrypts and directs to the determined address a special authorization request (message M2) containing information blocks I1, I2, and I3 (the information block I2 only in the first variant of the information exchange). The issuer PC 4 independently of the number of information blocks included in the message M2 decrypts only information blocks I1 and I3. The content of the information block I3 is compared with the data on that payment instrument and its holder (respondent 16) stored in the database of the issuer PC 4. If validity of the payment instrument and its holder is confirmed, the issuer PC 4 checks whether the respondent 16 has previously answered those poll questions indicated in the information block I1. Such check is practicable due to the fact that the information about all performed authorizations is stored in the database of the issuer PC 4. According to the results of the two mentioned checks the issuer PC 4 transmits the answer back to the acquirer PC 5 (message M3). As in the case of purchasing, the content of the answer of the issuer PC 4 depending on the authorization method is either displayed on the screen of the operator terminal of the acquirer PC 5 for immediate voice transmission to the point-of-sale 8 cashier, or is directed by the computer system of the acquirer PC 5 to the point-of-sale 8 terminal or ATM 7 (message M4). Then, if both said checks were completed successfully, either issuer PC 4 or acquirer PC 5, depending on the selected variant of information exchange, directs via the dedicated telecommunication network 9 encrypted electronic message to the PDPC 17 (message M5), including information blocks I1, I2, and I3 (the information block I3 is included only in the case of the open polls). The PDPC 17 accumulates all received messages M5, processes the data contained therein and transmits on completing the poll the poll results to the poll customer.

While carrying out the poll in the system according to the present invention, an electronic messages containing data related to the respondents' 16 answers will be provided by the processing centers 4-6 of that system to the PDPC 17 (FIG. 5), either via the dedicated telecommunication network 9 of the payment system, or via the public telecommunication network 10. Said messages are routed through the CD 19 to the communication computer 18 which decrypts them and then, via LAN 23, directs the decrypted data to the central computer 20. The central computer 20 processes those data and stores both the data and the processing results into the LTDSD 21. On the basis of mentioned results of processing the central computer prepares a poll report based on the above processing results in a format suitable to transmit subsequently this report to the poll customer. PDPC 17 operators prepare, by means of the personal computers 22 connected to LAN 23, the PDPC 17 computer system for the next poll, ensure on-line control over the poll data processing, and carry out diagnostics of the computer system, its software modernization, etc.

In the common case the PDPC 17 is not included in the above mentioned payment system and, correspondingly, does not conform to its rules. However, when the PDPC is connected via the dedicated telecommunication network 9 with the PCs 4–6 of this system it should comply with the rules of this payment system but only as far as information exchange protocols utilized in the dedicated telecommunication network 9 are concerned. Nevertheless, the functions of the PDPC 17 could be performed by any of PCs 4–6 of this payment system, provided the corresponding agreement has been reached.

The above described scheme for carrying out polls by means of the system according to the present invention does not practically depend on the level of the payment system participating in this poll (international, national, regional, local) since a change of the payment system level means only corresponding changes of the administrative scale of this system and does not involve any substantial changes either in the structure of the payment system, or in the rules of interaction of its elements when carrying out the poll. Due to the same reason, the above described scheme for carrying out polls is fully applicable even when the payment system utilized in the poll is an aggregate of two or more payment systems, provided the payment instruments of each of these systems are also valid in the accepting network of all other systems forming the mentioned aggregate, while electronic messages between these payment systems are exchanged via communication gates connecting the dedicated telecommunication networks of these systems. Furthermore, the system for carrying out polls according to the present invention allows to combine the possibilities of any number of independent payment systems simply by adding the results provided by each of the utilized independent systems.

The method for carrying our polls among the holders of the payment instruments of the payment system of the system according to the present invention is implemented as follows. The organization acting as the poll customer and the PDPC should agree on all technical parameters of a future poll including the poll type (open or anonymous), numbers of questions and corresponding variants of answers, types of payment instruments admitted for participating in the poll, allowed authorization methods and types of devices, etc. Before starting the poll the PDPC transmits to each of the payment system PCs an electronic notification of the forthcoming poll, including the following data:

poll code;

poll date or timeframe for carrying out the poll;

poll type;

list of BINs admitted to participate in the poll;

authorization methods to be used during the poll (only for acquirer PCs);

types of the devices which can be used when carrying out the poll (if the electronic authorization is allowed; only for acquirer PCs);

conditions on which the PC will transmit to the PDPC information about the respondents' answers to the poll questions;

other necessary data.

In its turn, the organization being the poll customer notifies, in one way or another, the holders of the payment instruments about the forthcoming poll. Particularly, such announces can be printed on receipts provided after each purchase maid by the holders, or on account statements which are regularly prepared by the issuers for their holders. Said announces can also be published in mass-media, distributed in the form of booklets, or placed on advertisement boards in public places, etc. If several polls coincide in time, it is worthwhile to use colored paper when printing advertising information on those polls, which implies that only one of the possible colors should correspond to a specific poll. The following parameters are to be indicated in the announcement:

poll date or timeframe for carrying out the poll;

poll code;

numbers and formulations of questions;

answer codes;

other information.

The method for carrying out polls being described allows the respondents both to combine participation in a poll with making purchases in points-of-sales, withdrawing cash at ATMs and obtaining cash advances in retail outlets, or to use the mentioned points of acceptance only for the purposes of participating in the poll.

When being in the point-of-sale and desiring to participate in the poll, the respondent (holder of the payment instrument) gives his/her payment instrument to the cashier who checks visually the validity and, as far as possible, the authenticity of this card. If the payment system rules require that the holder's photo should appear on the card, the cashier also compares the respondent with a person in that photo.

Further proceeding depends on the type of authorization utilized by that point-of-sale. In the case of voice authorization the cashier calls an operator of the acquirer PC servicing this point-of-sale and reports the "poll operation" code followed by the poll, question and answer codes dictated by the respondent. Then, as it was mentioned above in the description of the system operation according to the present invention, the operator initiates two checks: verifying the information on the payment instrument providing by the cashier and making sure that the responding is not attempting to re-answer this question. The information concerning the results of these checks appears on the operator's monitor of the acquirer PC, and he/she informs the cashier that the "poll operation" was either successfully completed or declined. If the operation is declined, the operator will give the appropriate reason. In the case of positive answer the cashier provides the respondent with a specific receipt containing the following information: a date, time and place of the respondents' answer, poll code, number of the question, answer code, and other necessary information.

If a POS terminal is available, the cashier types on the POS terminal keyboard the "poll operation" code and, at the respondent' dictation, the poll code, number of the question and answer code, and inserts the payment instrument into the terminal. If according to the rules of this point-of-sale the respondent should be additionally identified by the use of a PIN, the respondent types, following the cashier's instructions, his/her PIN on a separate PIN pad turned to the respondent and protected from a stranger's look. When the cashier presses a certain key, the POS terminal transmits via the telecommunication network to the acquirer PC an encrypted electronic message comprising the above mentioned information blocks I1–I3 with the data entered by the cashier and read from the respondent's payment instrument. This message is an instruction for the acquirer PC to initiate the "poll operation", which includes the same checks used in the case of voice authorization. When the checks are completed, the acquirer PC transmits an encrypted electronic message (answer) to this POS terminal via the telecommunication network. In the case of positive answer the POS terminal provides the respondent with a special receipt containing the following information: the date, time and place of the respondent's answer, number of the respondent's payment instrument, poll code, number of the question, answer code, and other necessary information.

In the above described variants of the respondent's poll participation, the data related to this respondent will be available to the point-of-sale cashier, and in the case of voice authorization said information will also be known to the operator of the acquirer PC. Besides, it is not protected against tapping devices. If the respondent does not want the mentioned data to become available to anyone else, he/she may choose a POS terminal with the PIN pad which implies that only the "poll operation" code will be entered by the cashier. Other data needed to answer the poll questions will be entered by the respondent himself/herself. Nevertheless, the fact of the respondent's participation in this poll will still be known to the cashier. Should the respondent consider this information confidential, he/she may participate in the poll by means of an unattended (stand alone) POS terminal or ATM. In this case all the subsequent operations will be performed by the respondent himself/herself: he/she will be required to enter the "poll operation" code, the poll code, number of the question, and answer code, insert his/her payment instrument into this device for reading the data stored on it, and, finally, initiate the transmission of the electronic message generated by this device to the acquirer PC. On completing the "poll operation" the device provides the respondent with a special receipt containing information on the completed operation.

Irrespective of the respondents' preferences concerning methods or devices used to answer the poll questions, the PDPC may additionally limit, in agreement with the customer of this poll, the functionality of the payment system related to this poll for the whole period of the poll by sending to the processing centers corresponding instructions included in the electronic poll notifications. The PDPC may, for example, prevent the processing centers from handling voice authorization requests with the "poll operation" code, as well as electronic requests with the same code of operation received from POS terminals not equipped with PIN pads. In this case the acceptance network servicing this poll should be provided with a sufficient amount of ATMs and PIN-based POS terminals, otherwise such limitations can substantially decrease the poll efficiency or even make it impossible.

To increase participation attractiveness for holders of the payment instruments and, as a consequence, to increase the number of respondents, various methods of attracting and stimulating holders may be used, including, for example, lotteries among the poll respondents. Said lotteries should be performed after the poll has been completed, whereas poll receipts provided to the respondents may be used as lottery tickets. Respondents may also be granted rewards or discounts upon presentation of these specific receipts. Regardless of the motivation method implied, prizes can be given to respondents to reward both their participation in the poll and provision of answers to a specific question of the poll. Any other socially secure forms and methods to attract and stimulate holders for poll participating are also admissible.

The abode described invention allows to carry out votes, referenda and public opinion polls, reduces costs for creating the system for carrying out the above arrangements, ensures its repeated utilization, and allows to achieve maximum comfort for participants of votes, referenda and public opinion polls.

What is claimed is:

1. A system for carrying out votes, referenda and public opinion polls, the system including an integrated system for collecting data on arrangements being carried out, said integrated system consisting of a data collection subsystem and data preprocessing subsystem interconnected by means of a data network, characterized in that a payment system of any level—international, national, regional, local, or a combination of such payment systems is used as the integrated system for collecting the data on arrangements being carried out, and a communication environment of said payment system is used as the data network, said system for carrying out votes, referenda and public opinion polls comprising further a poll data processing center for a final processing of said data, the center being connected to said data collection and data preprocessing subsystems via said communication environment, a software of said payment system including an additional set of functions for carrying out votes, referenda and public opinion polls, for preprocessing the data on arrangements being carried out, for encrypting and decrypting those data, and for placing the data into information blocks to carry out both open and secret votes, referenda and public opinion polls, to exchange electronic messages containing said information blocks between said data collection and data preprocessing subsystems and the poll data processing center, and the software of the poll data processing center including a set of functions for exchanging said electronic messages with said subsystems, for decrypting the information blocks included into the messages, for accumulating and analyzing the data on votes, referenda and public opinion polls contained in the information blocks.

2. The system by the claim 1, characterized in that the poll data processing center consists of a communication computer with a communication device connected to the communication computer, a central computer with a long-term data storage device connected to the central computer, and personal computers, all said computers being coupled via a local area network, and said communication device being connected with said communication environment.

3. A method for carrying out votes, referenda and public opinion polls, the method including steps of: identifying voters and respondents in accordance with individual electronic key cards; receiving information on the choice made by the voters and respondents; transmitting the information via telecommunication networks, and processing subsequently the accumulated information; characterized in that the step of identifying the voters and respondents is performed by means of POS terminals and automatic teller machines operated by the payment system, and payment instruments of said payment system being at the disposal of the voters and respondents are used as the individual electronic key cards, and information about the voters and respondents as well as the choice made by the voters and respondents in the form of electronic messages consisting of encrypted information blocks are directed from said POS terminals and automatic teller machines to the processing centers of said payment system, wherefrom the electronic messages after preprocessing are directed to the poll data processing center for decrypting said information blocks and final processing the data on votes, referenda and public opinion polls.

* * * * *